United States Patent [19]

Miyasaka

[11] Patent Number: 4,935,056

[45] Date of Patent: Jun. 19, 1990

[54] WEAR-RESISTANT COPPER-BASE SINTERED OIL-CONTAINING BEARING MATERIALS

[75] Inventor: Motohiro Miyasaka, Kashiwa, Japan

[73] Assignee: Hitachi Powdered Metals Co., Ltd., Matsudo, Japan

[21] Appl. No.: 419,669

[22] Filed: Oct. 11, 1989

[30] Foreign Application Priority Data

Oct. 17, 1988 [JP] Japan .................. 63-259507

[51] Int. Cl.⁵ ............................ C22C 29/00
[52] U.S. Cl. ....................... 75/231; 75/243; 75/247; 420/496
[58] Field of Search ............ 75/231, 243, 247; 420/496

[56] References Cited

U.S. PATENT DOCUMENTS

| | | |
|---|---|---|
| 3,607,248 | 9/1971 | Wallace ............................ 75/154 |
| 3,869,259 | 3/1975 | Lindsey ............................ 75/156 |
| 3,969,084 | 7/1976 | Wantabe et al. .................. 29/182.1 |
| 3,985,477 | 10/1976 | Antrim et al. .................... 418/122 |
| 4,008,051 | 2/1977 | Cadle ............................... 29/182.3 |
| 4,207,096 | 6/1980 | Suwa et al. ....................... 75/153 |
| 4,551,395 | 11/1985 | Lloyd ............................... 428/677 |
| 4,666,667 | 5/1987 | Kamio et al. ..................... 420/471 |
| 4,732,731 | 3/1988 | Asai et al. ........................ 420/473 |

*Primary Examiner*—Stephen J. Lechert, Jr.
*Assistant Examiner*—Nina Bhat
*Attorney, Agent, or Firm*—Sherman Levy

[57] ABSTRACT

A wear-resistant copper-base sintered oil-containing bearing material having a structure which contains 2 to 11 % by weight of tin and 1 to 20 % by weight of cobalt and further includes 2 to 15 % by weight of at least one of molybdenum disulfide, graphite and lead serving as solid lubricants. Disperesed throughout that structure is cobalt at an average particle size equal to or less than 20 μm.

1 Claim, 1 Drawing Sheet

1

2

3

4

5

1

2

3

4

5

WEAR-RESISTANT COPPER-BASE SINTERED OIL-CONTAINING BEARING MATERIALS

BACKGROUND OF THE INVENTION

1. Field of the Invention

The present invention relates to a wear-resistant copper-base sintered oil-containing bearing material unlikely to mar an associated sliding shaft.

2. Prior Art

A sintered oil-containing bearing has a matrix alloy phase generally difficult to seize onto a shaft that is an associated member, includes therein an oil-containing hole for feeding a lubricating oil onto the sliding surface and may contain an additional solid lubricant, if required, to maintain lubrication during sliding.

Such sintered oil-containing bearing alloys based on copper and tin include one set forth in, for instance, Japanese Patent Publication No. 60-35978 issued in the name of the present applicant. This alloy is obtained through considerations on the influence of a matrix alloy and a solid lubricant upon the behavior of a sliding surface, and takes aim at preventing any plastic deformation of the matrix alloy by adding nickel or cobalt to the matrix alloy to impart increased toughness thereto, thereby allowing the solid lubricant to emerge effectively on the sliding surface to fulfill satisfactorily its lubricating function.

Specifically, this alloy is obtained by adding 1 to 20% of at least one of nickel and cobalt to a copper/tin-base material containing 2 to 15% of a solid lubricant.

The alloy provides a bearing material which is much more reduced in wear losses than a conventional copper/tin-base sintered oil-containing bearing to which a solid lubricant is added.

The alloy may be prepared by formulating electrolytic copper powders of 100 mesh or below in particle size and tin powders of 100 mesh or below as well as nickel or cobalt powders, molybdenum disulfide powders and lead powders, all of 200 mesh or below, into the above composition and forming and sintering the composition in ordinary manners.

With the matrix alloy reinforced, such a conventional sintered oil-containing bearing material as mentioned above tends to make a relatively strong attack on an associated shaft, so that it bites off and injures the shaft, ending up in an increase of the coefficient of friction.

Such a phenomenone does not occur in the case of shafts formed of quenched bearing steel or stainless steel and so offers no practical problem, but is found with those of carbon steel or stainless steel not heat-treated (hereinafter referred to as the green material).

Shafts formed of the green material are favorable in terms of cost and tend to be industrially used in combination with sintered oil-containing bearings. Thus, there is now still a demand for materials which make no attack on associated members.

Accomplished with the foregoing in mind, the present invention has for its object to eliminate such making-an-attack properties with respect to shafts of existing materials.

SUMMARY OF THE INVENTION

According to a general object of the present invention, there is provided a sintered oil-containing bearing material comprising a solid lubricant-containing copper/tin-base material to which cobalt is added, said cobalt being dispersed throughout it at a specific particle size.

According to a specific aspect of the present invention, there is provided such a bearing material characterized by having a structure which contains 2 to 11% by weight of tin, 1 to 20% by weight of cobalt and 2 to 15% by weight of at least one of molybdenum disulfide, graphite and lead serving as solid lubricants and throughout which cobalt is dispersed at an average particle size of 20 μm or below.

BRIEF DESCRIPTION OF THE DRAWINGS

The present invention will now be explained in detail with reference to the accompanying drawings, in which.

DETAILED DESCRIPTION OF THE INVENTION

Figure 1A:
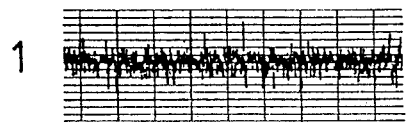
FIGS. 1A and B are charts showing the results of measurement of the surface roughness of shafts before and after bearing tests.

The ingredients of the present alloy will first be explained.

Usually, the ratio of tin to be added to copper/tin-base sintered alloys is in a range of 8 to 11% by weight. In the present invention, however, a tin range of 2 to 11% by weight is applicable because of a toughening effect of the addition of cobalt upon this matrix, as will be described later.

In the preparation of the alloy, a mixture of copper powders with tin powders and alloy powders may be used as the starting materials alike.

Cobalt forms a part of the alloy with copper and tin and is finely dispersed throughout the structure so as to serve as a reinforcement for the matrix. Cobalt should then be used in preferred quantity and particle size. With cobalt dispersed at a larger particle size, a green material shaft may be readily injured during sliding, since the particles of cobalt tend to overact. It is thus required that the average particle size of cobalt be equal to or less than 20 μm.

To this end, cobalt may be added in the form of cobalt powders having an average particle size of 20 μm or below. Alternatively, use may be made of cobalt powders metallurgically deposited to bronze alloy powders or copper powders.

Cobalt is advantageously added in a quantity ranging from 1 to 20% by weight. At less than 1% by weight, the matrix is not reinforced as desired, whereas at higher than 20% by weight, the green material shaft may tend to be injured.

The solid lubricants used include conventional molybdenum disulfide, lead and graphite, which may be used alone or in combination. They may be added in a range of 2 to 15% by weight, but a range of 2 to 10% by weight is preferable in terms of cost effectiveness. Quantities of the solid lubricants less than 2% by weight and higher than 15% by weight are all undesirable, since no lubricating effect is attained in the former case and the strength of material is reduced in the latter case.

EXAMPLES

The present invention will now be explained specifically but not exclusively with reference to some examples.

Such starting powders as mentioned below were prepared. Four types of cobalt powders were used with Powders A standing for conventional ones.

(1) Cu-9% Sn alloy powders . . . −100 mesh.
(2) Electrolytic copper powders . . . −100 mesh.
(3) Tin powders . . . −200 mesh.
(4) Cobalt powders . . . four types A to D having such size distribution as specified in Table 1.
(5) Lead powders . . . −250 mesh
(6) Molybdenum disulfide powders . . . −100 mesh.
(7) Graphite powders . . . −100 mesh.

These powders were formulated into such compositions as set forth in Table 2, formed into a bearing shape with the use of a die and then sintered at a temperature of 780° C. in a cracked ammonia gas. Subsequently, the sintered compacts were sized to give dimensions of 6.5 g/cm$^3$ in density and impregnated with a turbine oil corresponding to viscosity grade 68 to prepare samples.

In Table 2, MoS$_2$ and C stand for molybdenum disulfide and graphite, respectively, and Cu is omitted. In Column "Co", A to D have the same meanings as defined in Table 1.

A bearing durability test was made of each sample. The shafts used were each formed of a green structural carbon steel S45C material and run for 200 hours at a sliding speed of 5 m/min., a load of 2 kgf/cm$^2$ and a surrounding temperature of 160° C.

The testing results are set out in Table 3 along with the surface roughness measurements of the samples.

Samples 1 and 2, prepared for the purpose of comparing the elements for reinforcing the matrices of bearing materials, typically, conventional ones, were both reduced in bearing wear losses but found to mar the associated members.

Figure 1A:
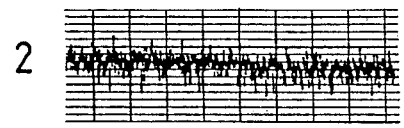
Figure 1A:
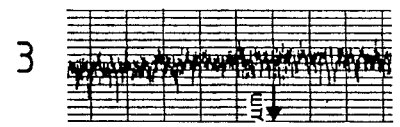
Figure 1A:
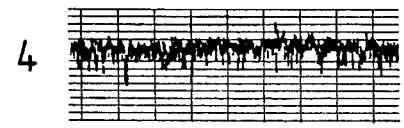
Figure 1A:
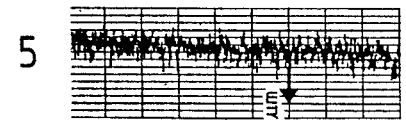
Figure 1B:
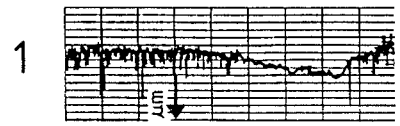
Figure 1B:
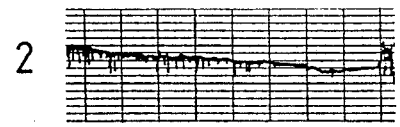
Figure 1B:
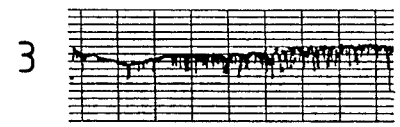
Figure 1B:
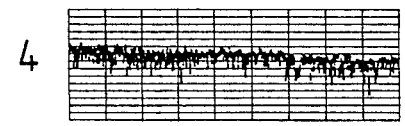
Figure 1B:
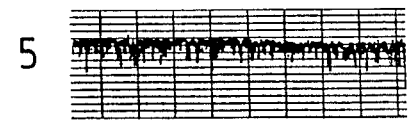

FIG. 1 illustrates the shafts' surface roughness before and after the tests with Nos. 1 to 5 corresponding to those in Tables 2 and 3, and reveals that the surface roughness (A) before the tests, shown right, was changed to the surface roughness (B) after the tests, shown left. As illustrated, the samples were all reduced in surface roughness and worn away in concave form. FIG. 1 is presented with a graduation of 0.2 μm as ordinate and a graduation of 0.5 mm as abscissa.

Detailed investigations indicate that nickel has the property of tending to mar the shaft due to its hardness. This appears to be because nickel is so apt to forming an alloy with copper and tin that it is in the form of a hard intermetallic compound.

Sample Nos. 2 to 5 account for the influence of the particle size of cobalt, and reveal that better results are obtainable at a particle size smaller than the conventional one (shown at A). In particular, Sample Nos. 4 and 5 having an average particle size of 20 μm or below are favorable. It is noted that the particle size of cobalt can be measured by plane and line analyses with characteristic X rays, and that the resulting measurements are substantially in coincidence with those of the raw powders.

Sample Nos. 6 and 7, containing increased amounts of three solid lubricants, are found to be low in hardness but improved in terms of bearing performance.

Sample Nos. 5, 8 and 9, provided for comparing the effects of the amounts of cobalt added, are found to be increased in hardness with an increase in such amounts but suffer from wearing.

Sample No. 10, containing a decreased amount of tin but an increased amount of cobalt, gives better results.

The surface roughness of the shafts by Sample Nos. 6 to 10 is omitted from FIG. 1, since it shows a waveform similar to those achieved by Sample Nos. 4 and 5.

On the other hand, these bearing samples were tested with shafts formed of heat-treated bearing steel SUJ2. However, no bruises were found on both the shafts and the bearings. Nor was any significant difference found in the case of hard shafts.

TABLE 1

| Mesh | Distribution of Particle Size (Weight %) | | | |
|---|---|---|---|---|
| | A | B | C | D |
| +200 | Slight | — | — | — |
| +250 | 4 | Slight | — | — |
| +350 | 28 | 8 | — | — |
| −350 | 68 | 92 | 100 | 100 |
| Average Particle Size (μm) | 35 | 27 | 20 | 5 |

TABLE 2

| | Sn | Ni | Co | MoS$_2$ | Pb | C |
|---|---|---|---|---|---|---|
| 1 | 9 | 3 | — | 2.5 | 1 | — |
| 2 | 9 | — | 3 (A) | 2.5 | 1 | — |
| 3 | 9 | — | 3 (B) | 2.5 | 1 | — |
| 4 | 9 | — | 3 (C) | 2.5 | 1 | — |
| 5 | 9 | — | 3 (D) | 2.5 | 1 | — |
| 6 | 9 | — | 3 (C) | 2.5 | — | 3 |
| 7 | 9 | — | 3 (C) | 5.0 | 1 | 3 |
| 8 | 9 | — | 7 (C) | 2.5 | 1 | — |
| 9 | 9 | — | 10 (C) | 2.5 | 1 | — |
| 10 | 4 | — | 15 (C) | 2.5 | 1 | — |

TABLE 3

| Sample No. | Surface Hardness HRH | Wearing Loss (μm) | | Shafts' Wearing and Bruises |
|---|---|---|---|---|
| | | Bearings | Shafts | |
| 1 | 65 | 2 | 2 | Found |
| 2 | 55 | 2 | 1 | Found |
| 3 | 55 | 2 | 1 | Found |
| 4 | 53 | 1 | 0 | Not Found |
| 5 | 53 | 1 | 0 | Not Found |
| 6 | 43 | 2 | 0 | Not Found |
| 7 | 43 | 2 | 0 | Not Found |
| 8 | 57 | 1 | 0 | Not Found |
| 9 | 60 | 1 | 0 | Not Found |
| 10 | 60 | 1 | 0 | Not Found |

As explained in the foregoing, the present invention improves the sintered oil-containing bearing material heretofore developed and typically set forth in Japanese Patent Publication No. 60-35978 and limits the matrix-reinforcing element to cobalt and its average particle size to 20 μm or below. It is thus unlikely that the present material may mar an associated member, even when it is formed of the green material. The present material is also applicable to heat-treated materials, and so finds application in a wider range of fields.

What is claimed is:

1. A wear-resistant copper-base sintered oil-containing bearing material having a structure which contains 2 to 11% by weight of tin and 1 to 20% by weight of cobalt and further includes 2 to 15% by weight of at least one of molybdenum disulfide, graphite and lead serving as solid lubricants, and throughout which cobalt is dispersed at an average particle size equal to or less than 20 μm.

* * * * *